US008694483B2

(12) United States Patent
Roulland et al.

(10) Patent No.: US 8,694,483 B2
(45) Date of Patent: Apr. 8, 2014

(54) REAL-TIME QUERY SUGGESTION IN A TROUBLESHOOTING CONTEXT

(75) Inventors: Frederic Roulland, Le Versoud (FR); Stefania Castellani, Meylan (FR); Aaron N. Kaplan, Grenoble (FR); Maria Antonietta Grasso, Grenoble (FR); Jacki O'Neill, Grenoble (FR); Jonina Selin, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1623 days.

(21) Appl. No.: 11/875,183

(22) Filed: Oct. 19, 2007

(65) Prior Publication Data

US 2009/0106224 A1 Apr. 23, 2009

(51) Int. Cl.
*G06F 7/00* (2006.01)
*G06F 17/30* (2006.01)

(52) U.S. Cl.
USPC .......................................................... 707/706

(58) Field of Classification Search
None
See application file for complete search history.

(56) References Cited

U.S. PATENT DOCUMENTS

| | | | |
|---|---|---|---|
| 4,839,853 A | | 6/1989 | Deerwester et al. |
| 6,564,213 B1 * | | 5/2003 | Ortega et al. |
| 6,578,022 B1 * | | 6/2003 | Foulger et al. .................. 706/45 |
| 7,058,567 B2 | | 6/2006 | Ait-Mokhtar et al. |
| 7,565,338 B2 * | | 7/2009 | Beniaminy et al. |
| 2003/0110413 A1 | | 6/2003 | Bernklau-Halvor |
| 2006/0106769 A1 * | | 5/2006 | Gibbs |
| 2006/0259479 A1 | | 11/2006 | Dai |
| 2007/0192085 A1 | | 8/2007 | Roulland et al. |

FOREIGN PATENT DOCUMENTS

| | | |
|---|---|---|
| EP | 1 302 861 | 4/2003 |
| EP | 1 835 451 | 9/2007 |
| JP | 2001-184347 | 7/2001 |
| JP | 2001-249933 | 9/2001 |
| WO | WO 01/80079 A | 10/2001 |

OTHER PUBLICATIONS

U.S. Appl. No. 11/341,788, filed Jan. 27, 2006, Segond, et al.
U.S. Appl. No. 11/354,688, filed Feb. 15, 2006, Roulland.
U.S. Appl. No. 11/544,200, filed Oct. 6, 2006, Roulland, et al.
U.S. Appl. No. 11/805,456, filed Jul. 16, 2007, Castellani, et al.
G.Salton, C.Buckley, Improving Retrieval Performance by Relevance Feedback, in *J. Am. Soc. for Information Science*, 41(4): 288-297. 1990.

(Continued)

*Primary Examiner* — Hosain Alam
*Assistant Examiner* — Reza Hosseini
(74) *Attorney, Agent, or Firm* — Fay Sharpe LLP

(57) ABSTRACT

A method for assisting a user to develop a query in a natural language includes receiving a user's query in a natural language and, while the user's query is being entered, presenting a subset of ranked query suggestions from a collection of ranked query suggestions to the user as candidates for user queries. The subset is based on that portion of the user's query already entered. The query suggestions in the subset of query suggestions are presented according to their respective rankings in the collection. Each of the query suggestions in the collection is formulated to retrieve at least one responsive instance in the knowledge base. The rankings of the query suggestions in the collection are based at least in part on stored logs of prior user sessions in which user queries were input to a search engine for retrieving responsive instances from the knowledge base.

24 Claims, 6 Drawing Sheets

(56) References Cited

OTHER PUBLICATIONS

C.Buckley, G.Salton, J.Allan, Automatic Retrieval with Locality Information Using Smart, in *The First Text Retrieval Conference (TREC-1)*, National Institute of Standards and Technology, Gaithersburg, MD, 1992, pp. 59-72.

Y.Qiu, H.P.Frei, Concept Based Query Expansion, in *Proc. SIGIR'93*, Pittsburgh, Jun. 27-Jul. 1, 1993, ACM, Press.

E.Amitay, A.Darlow, D.Konopnicki, U.Weiss, Queries as Anchors: Selection by Association, in *Proc. HT'05*, Sep. 6-9, 2005, Salzburg, Austria.

A.Aronson, T.Rindflesch, Query Expansion Using the UMLS Metathesaurus, in *Proc. 1997 AMIA Annual Fall Symp.*, 485-89.

J.O'Neill, A.Grasso, S.Castellani, P.Tolmie, Using Real-Life Troubleshooting Interactions to Inform Self-Assistance Design, *Proceedings of INTERACT*, Rome, Italy, Sep. 12-16, 2005. Abstract, Ref.: 2005/003, http://labs.google.com/suggestfaq.html.

* cited by examiner

REAL-TIME QUERY SUGGESTION IN A TROUBLESHOOTING CONTEXT

CROSS REFERENCE TO RELATED PATENTS AND APPLICATIONS

The following copending applications, the disclosures of which are incorporated herein in their entireties by reference, are mentioned:

U.S. application Ser. No. 11/544,200, filed Oct. 6, 2006, entitled NAVIGATION SYSTEM FOR TEXT, by F. Roulland, et al.;

U.S. application Ser. No. 11/341,788, filed Jan. 27, 2006, entitled LINGUISTIC USER INTERFACE, by Frederique Segond, et al.; and U.S. application Ser. No. 11/805,456, filed Jul. 16, 2007, entitled INFORMING TROUBLESHOOTING SESSIONS WITH DEVICE DATA, by Stefania Castellani, et al.

BACKGROUND

The exemplary embodiment relates to the linguistic processing arts. It finds particular application in conjunction with assisting a user to develop queries for searching a structured knowledge base, such as a manual for troubleshooting of faults with electromechanical devices, and will be described with particular reference thereto. However, it is to be appreciated that it is also amenable to other like applications.

Many of the devices used today, both within the workplace and outside it, are highly complex. Such devices include electromechanical devices, such as image reproduction devices, e.g., printers and photocopiers, vehicles, and audio and visual equipment, such as cameras, video recorders, cell phones, dictation devices, music systems, computing devices, such as personal computers, and the like. As computing power has increased, so the functionality of these devices has also increased. The added functionality is wasted, however, if users do not know how to use or maintain the device or are unable to locate the necessary information to do so.

When a customer observes a problem with an electromechanical device, it is advantageous for the customer to determine how to repair the device without requiring a visit from a service engineer. The customer may therefore try to troubleshoot the machine problem, for example, by following instructions on the machine, by searching for solutions in online resources, or by contacting the manufacturer's help line (e.g., by phone or email). The troubleshooting process generally requires the user to articulate the symptoms of the problem so that the likely solutions can be retrieved from the resource. However, troubleshooting systems with natural language query based user interaction usually provide efficient results only if the user has some expertise of the terminology used in the underlying knowledge base and is able to choose "good" words in the query. This leads to user frustration and abandonment of the troubleshooting process, resulting in an expensive service visit for remediation and a period in which the device is performing suboptimally.

Moreover, when the troubleshooting capabilities are embedded within a system (the place where the problem occurs), the user interaction is also constrained by the affordances of the device. In particular, a Multifunction Device (MFD), such as a device having printing, copying, and optionally fax or email capability, may not have a proper keyboard to enter a query which may make the tasks difficult, especially if this is combined with the need of having to write several iterations of the query.

There is a great deal of literature in the field of information retrieval (IR) on techniques for what is generally referred to as query expansion. This term is used to describe techniques used in vector space IR models or Boolean search engines with an OR operator, when adding more words to a query results in more results being retrieved (and may also improve the ranking). These techniques involve supplementing the original query with additional words that are related to those originally entered by the user. The expansion may be performed interactively, where the user is asked to select relevant words or documents, or automatically, where the system expands the query "behind the scenes." Such systems still suffer when there is a mismatch between the user's terminology and that of the information being searched.

INCORPORATION BY REFERENCE

The following references, the disclosures of which are incorporated herein in their entireties by reference, are mentioned.

U.S. Pub. No. 2007/0192085, published Aug. 16, 2007, entitled NATURAL LANGUAGE PROCESSING FOR DEVELOPING QUERIES, by Frederic Roulland, et al., discloses a system suited to self-troubleshooting a problem. The system includes a processor which identifies normalized forms of at least some of the words of a natural language user query input by a user. The user query may describe a problem experienced with a machine, such as a printer. The processor retrieves text strings which may comprise problem statements stored in memory 24. Each retrieved problem statement includes at least one word with a normalized form which is recognized by the processor as being equivalent to one of the identified normalized forms. Each of the retrieved problem statements may be associated with at least one solution sequence for addressing the problem with the machine. In the event that the stored problem statements in memory are not fully responsive, the processor provides one or more options for refinement of the user query based on tags associated with those words of the problem statements which are responsive.

U.S. Pat. No. 6,564,213, issued May 13, 2003, entitled SEARCH QUERY AUTOCOMPLETION, by Ortega, et al., discloses a system for facilitating online searches that suggests query autocompletion strings (terms and/or phrases) to users during the query entry process. The suggested strings are based on specific attributes of the particular database access system being searched.

U.S. Pat. No. 7,058,567, issued Jun. 6, 2006, entitled NATURAL LANGUAGE PARSER, by Aït-Mokhtar, et al., discloses a parser for syntactically analyzing an input string of text. The parser applies a plurality of rules which describe syntactic properties of the language of the input string.

U.S. Pat. No. 4,839,853, entitled COMPUTER INFORMATION RETRIEVAL USING LATENT SEMANTIC STRUCTURE, by Deerwester, et al., assumes that there is an underlying latent semantic structure in word usage data that is partially hidden or obscured by the variability of word choice. A statistical approach is utilized to estimate this latent structure and uncover the latent meaning. Words, the text objects and, later, user queries are processed to extract this underlying meaning and the new, latent semantic structure domain is then used to represent and retrieve information.

BRIEF DESCRIPTION

In accordance with one aspect of the exemplary embodiment, a method for assisting a user to develop a query in a natural language is provided. The method includes storing logs comprising information derived from prior user search sessions in which user queries were input to a search engine for retrieving responsive instances from a knowledge base. A collection of query suggestions is stored. Each of the query suggestions is formulated to retrieve at least one responsive instance in the knowledge base. The query suggestions in the collection are ranked, based at least in part on the stored logs. A user's query is received in a natural language. While the user's query is being entered, a subset of the ranked collection of query suggestions is generated and one or more of the query suggestions in the subset are presented to the user as candidates for user queries. The selection of the subset is based on that portion of the user's query already entered. The presentation of the query suggestions in the subset of query suggestions is based on their respective rankings in the collection.

In accordance with another aspect of the exemplary embodiment, a system for assisting a user to develop a query in a natural language includes memory which stores a ranked collection of query suggestions, each of the query suggestions formulated to retrieve at least one responsive instance in the knowledge base. A ranking of the query suggestions in the collection is based at least in part on stored logs of prior user interactions. A troubleshooting session support module in communication with the memory receives a user's query in a natural language and, while the user's query is being entered, presents at least one of a subset of the ranked collection of query suggestions to the user as candidates for user queries. The subset is based on that portion of the user's query already entered. The query suggestions in the subset of query suggestions are presented according to their respective rankings in the collection.

In another aspect, a method for assisting a user to develop a query in a natural language includes receiving a user's query in a natural language and, while the user's query is being entered, presenting a subset of ranked query suggestions from a collection of ranked query suggestions to the user as candidates for user queries. The subset is based on that portion of the user's query already entered. The query suggestions in the subset of query suggestions are presented according to their respective rankings in the collection. Each of the query suggestions in the collection is formulated to retrieve at least one responsive instance in the knowledge base. The rankings of the query suggestions in the collection are based at least in part on stored logs of prior user sessions in which user queries were input to a search engine for retrieving responsive instances from the knowledge base.

DETAILED DESCRIPTION

Figure 1:
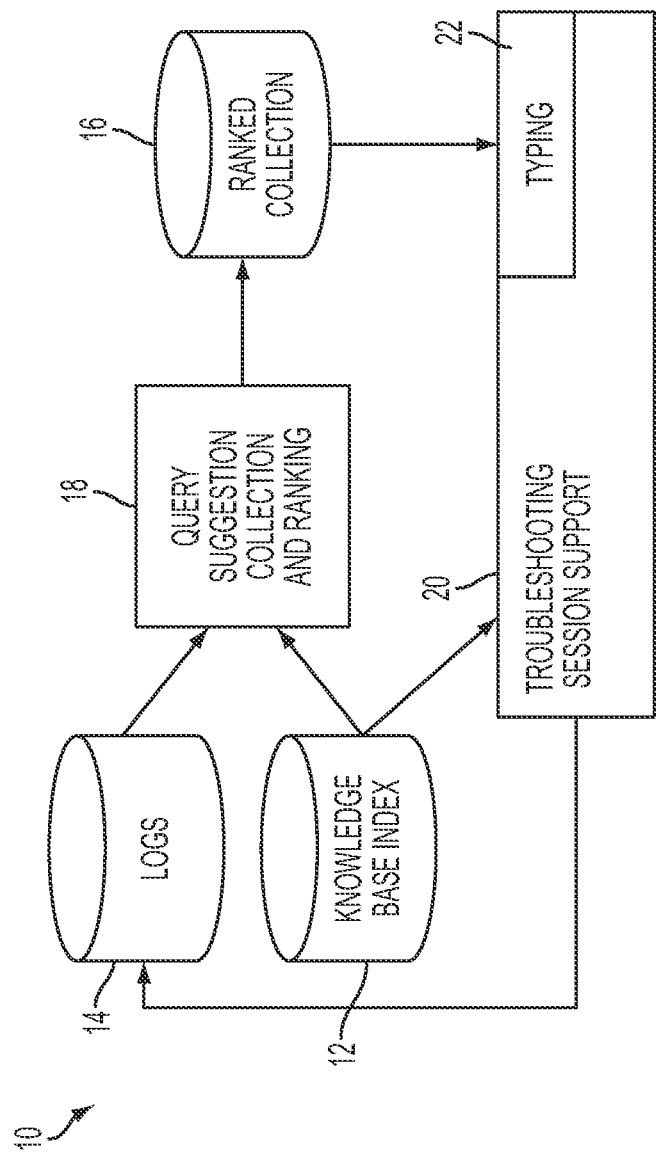
FIG. 1 is a functional block diagram of a system for development of query suggestions in accordance with a first aspect of the exemplary embodiment.

Above-mentioned application Ser. No. 11/544,200 and U.S. Pub. No. 20070192085, incorporated by reference, disclose systems and methods for accessing the content of a manual for troubleshooting problems associated with a device, such as a printer. The system includes a user interface which allows a user to input a query in a natural language and to refine the query to generate a problem statement by selecting from proposed refinements to the initial query which are developed by natural language processing (NLP) techniques. Likely solutions are displayed when the user selects a refined problem statement. Where multiple solutions are retrieved, the user may be instructed to attempt each solution in turn until the problem is resolved.

The feasibility of such a system depends on a link being established between the user's terminology and that of the knowledge base being searched, which can sometimes prove difficult. Furthermore such a system, like many search tools, does not give an immediate feedback on the validity of the query since the refinements are proposed to the user only once the query has been submitted. Various aspects of the exemplary embodiment allow such a link between the user's terminology and that of a knowledge base to be made and also allow for immediate feedback. It is to be appreciated, however, that the exemplary embodiment is not limited to use in troubleshooting contexts.

In the exemplary embodiment, a collection of ranked, predefined query suggestions (suggestions for user queries) derived from the knowledge base is stored in memory. When a user types a new character in a query input box of a user interface, responsive query suggestions are retrieved and presented according to their ranking in the collection. The ranking provides an estimation of each query's likelihood of success for retrieving results responsive to the user's intended query. The estimation of likelihood of success of the query suggestion used to generate the ranking may be informed by two considerations. The first is the quality of the results in the knowledge base that match the query suggestion. This helps to suggest queries with high quality results. The second consideration is based on the history of previous troubleshooting sessions. This helps to suggest queries that are likely to fit what the user wanted to type.

As a precursor to the exemplary method of query suggestion, the set of queries that are candidates for suggestion to a user is created from the knowledge base to be searched, so that only query suggestions that would retrieve at least one result from the knowledge base are taken into account. Then, query suggestions in this set are ranked according to their history (logs of previous troubleshooting sessions). This ranking may be based at least in part on a) frequency, e.g., how often they were used in previous troubleshooting sessions and b) performance, i.e., how well they have performed in previous troubleshooting sessions. Other factors, such as frequency of occurrence in the knowledge base, may also be factored into the ranking of query suggestions.

As described in further detail below, each query suggestion comprises a linguistically coherent expression which includes one or a group of syntactically related words. Examples of such expressions include a noun phrase, a prepositional phrase, verbal syntactic unit (a main verb combined with any auxiliary verbs and any direct object), combination of these, or the like. Each query suggestion may have a surface form of the linguistically coherent expression, which is suitable for presentation to a user, and an underlying (normalized) form. Each query suggestion is "found" at least once in the knowledge base, i.e., has at least one corresponding instance in the knowledge base. Each of the corresponding instances comprises one (or more) of a) an expression which is the same as the surface form of the query suggestion; b) an expression which has the same normalized form as the query suggestion; and c) an expression which is designated as being a synonym of the query suggestion and is thus capable of retrieving the instance when input to a search engine.

FIG. 1 illustrates a functional block diagram of an exemplary system 10 for developing query suggestions. The system 10 executes instructions for retrieving query suggestions that are responsive to a user's at least partially developed query. The system 10 may be embodied in a personal/office computing system or a device, such as a printer, or the like, and/or elsewhere, such as on a server. The illustrated system 10 includes a knowledge base 12, a collection of logs 14 of prior searches of the knowledge base (actual search data or data developed therefrom), and a collection 16 of query suggestions developed from the knowledge base together with rankings developed from the logs 14. The system 10 further includes a query suggestion collection and ranking module 18 which generates the ranked collection 16 of query suggestions and optionally updates it periodically, based on information from the logs 14 and knowledge base 12. A troubleshooting session support module 20 develops a set of the query suggestions from the collection 16 in response to a user input query. In the illustrated embodiment, support module 20 includes a typing component 22 which updates the responses during the typing of the query by a user. In particular, the typing component 22 filters the ranked collection of query suggestions, to identify a subset of the query suggestions, based on what the user has already typed. The typing component presents one or more of the query suggestions in the subset to the user, based on the rankings of the query suggestions in the subset.

Figure 2:
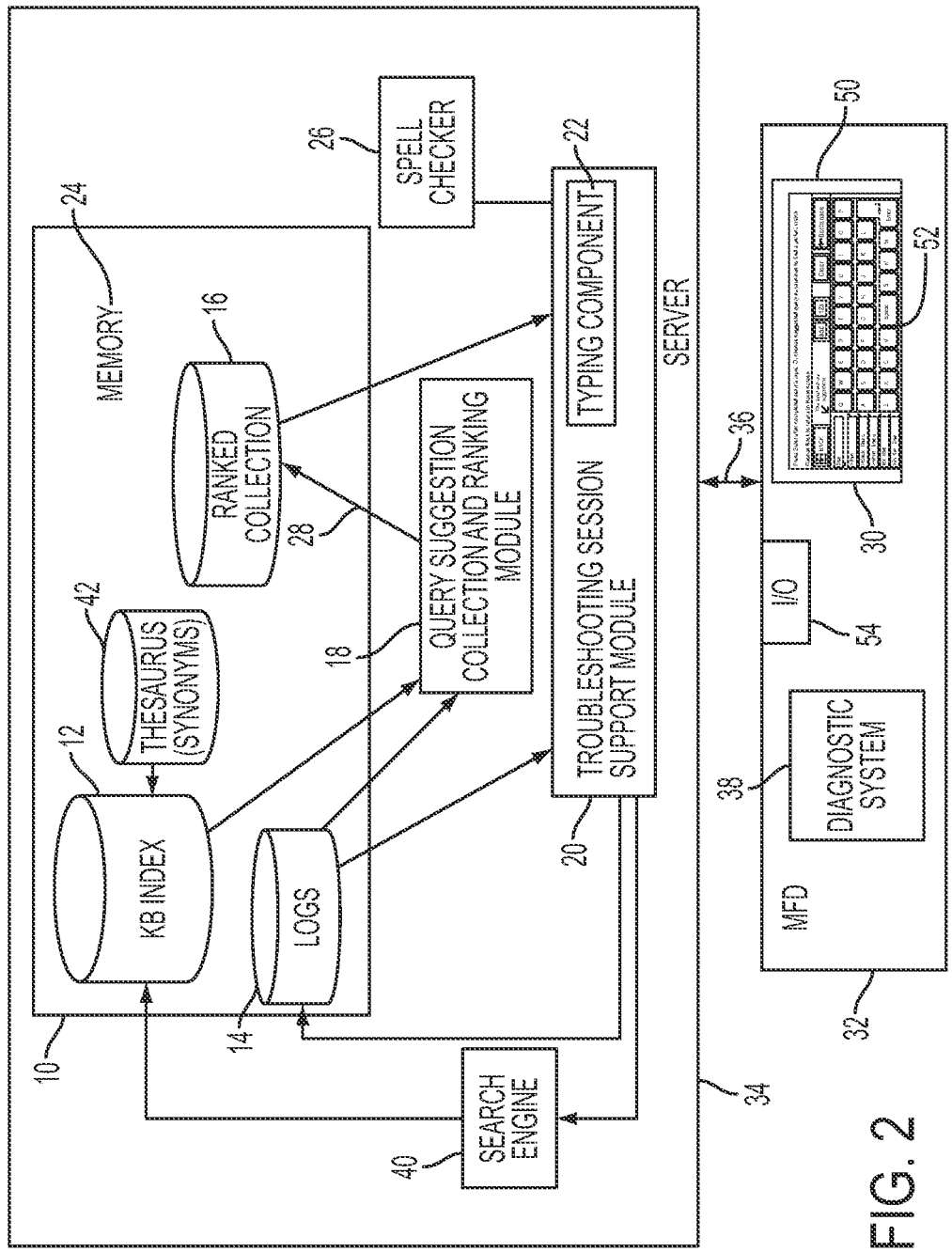
FIG. 2 illustrated an environment in which the exemplary system of FIG. 1 operates.

FIG. 2 illustrates an environment in which the exemplary system 10 may operate, by way of example. Knowledge base 12, logs 14, and the ranked collection 16 of query suggestions may be stored in memory(s) 24. The system 10 may further include a domain-specific spell check component 26 within or accessible to the support module 20. The components 12, 14, 16, 20, 22, 24, 26 of the system 10 may all be interconnected by one or more data/control buses 28.

The processing components 18 and 20 of the system 10 may be embodied in software, hardware, or both. In one embodiment, the components 20 and 22 execute instructions, stored in memory 24, for executing the exemplary method described herein and illustrated in FIGS. 3 and 4. Accordingly, the operation of these components is only briefly described here.

The system 10 interacts with a user interface 30, which in the illustrated embodiment, is resident on a device 32, here illustrated as a multifunction device (MFD). The system 10, or parts thereof, may be resident on a server 34 or other location which is remote from device 32 and may communicate with the user interface 30 via a wired or wireless link 36, such as a computer network, e.g., a local area network (LAN) or wide area network (WAN), e.g., the Internet. In another embodiment, the system 10, or components thereof, may be resident on the device 32.

The device 32 may be a printer, copier, scanner, fax machine, multifunctional device, network router, network switch, network computational device, such as a server or workstation, network file system, household appliance, such as a heating and cooling system, refrigerator, washing or drying machine, or any other electromechanical device which has electrical or mechanical parts that may require repair, replacement, or modification. The device may be connected to the communications network 36.

The exemplary device 32 may include a number of operating components (not shown) which, from time to time, may contribute, individually, or in combination, to faults in the operation of the device. These faults may be observed as problems by an operator using the device. In the case of a printer, for example, the components typically include one or more paper feeders, an image applying component or marking engine, which applies colorants such as inks or toners to the paper or other print media substrate to form an image thereon, optionally a fusing system for fixing the image more permanently to the substrate, a finisher, and a conveyor system which conveys print media from the feeder to the other components in turn. The device may further include or communicate with one or more internal diagnostic systems 38 which are capable of detecting, e.g., through sensors, at least some troubleshooting attempts by a user (e.g., opening and closing certain doors, removing certain components) and/or whether a certain detected fault has been corrected, if this is detectable.

The exemplary system 10 may further include or communicate with a search engine 40, which formulates the user's query in a suitable format for querying the knowledge base to retrieve responsive instances. Optionally, for example, where the knowledge base is not indexed according to synonyms, the system may further include or access a thesaurus 42, in the form of a finite state machine, which stores recognized synonyms of words or expressions in the knowledge base.

The illustrated user interface 30 may be a graphical user interface (GUI) and may include a display 50, such as a screen, and a user input device 52, such as a touch screen, keyboard, keypad, cursor control device, such as a mouse, track ball, pen, touch pad, stylus, or combination thereof. The user interface may interact with the troubleshooting system 10 via a web browser displayed on the display 50.

Figure 5:
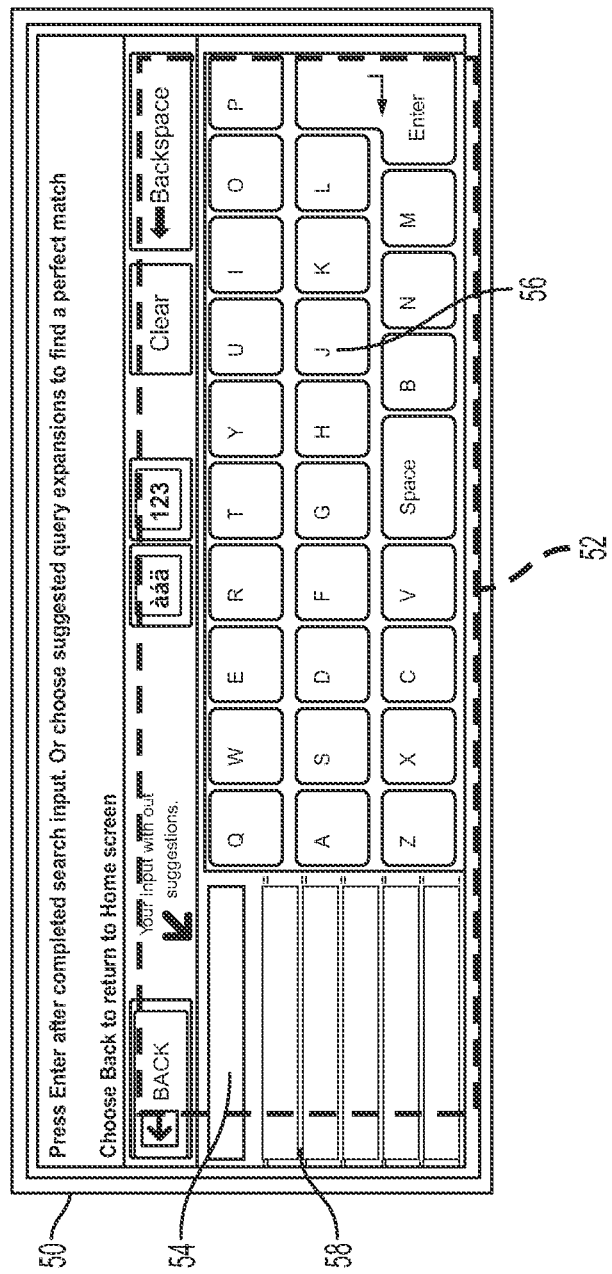
FIG. 5 illustrates a display of an exemplary query typing interface which may be generated by the system of FIGS. 1 and 2.

As illustrated in FIG. 5, the display 50 includes a user query box 54 which displays the user's query, as it is input, and a query suggestion area 58 for automatically displaying one or more of the ranked query suggestions developed by the support module 20. Although not illustrated, the display 50 may also display responses to the user's query and may display options for developing the query to more closely match problem statements in the knowledge base, e.g., via a navigation tree, as disclosed for example, in above-mentioned application Ser. No. 11/544,200, incorporated by reference. A user interacts with the user interface 30 by manipulation of the associated user input device 52. A user can enter a query as a text string as well as navigate the screens and other features of the graphical user interface, such as one or more of a toolbar, pop-up windows, scrollbars (a graphical slider that can be set to horizontal or vertical positions along its length), menu bars (a list of options, which may be used to initiate actions presented in a horizontal list), drop down menus (a list of options that can be used to present menu sub-options), and other features typically associated with web browsers. The user interface 30 inputs full or partial queries to the system 10 via a suitable input/output device 54. As will be appreciated, the user interface 30 may include separate processing capability which is compatible with that of the system 10.

The user interface 30 can be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like, such as incorporated into a workstation of a computer network or other computer device such as a personal computer or mobile computer device, such as a PDA, a cell phone, a Tablet PC, a Pocket PC, or other suitable electronic device.

The memory(s) 24 may represent any type of computer readable medium such as random access memory (RAM), read only memory (ROM), magnetic disk or tape, optical disk, flash memory, or holographic memory. In one embodiment, the memory 24 comprises a combination of random access memory and read only memory.

The knowledge base 12 can comprise any closed corpus (generally, a limited set of one or more digital documents in a natural language, such as English or French) and may be in the form of a relational database or as hypertext documents, such as extensible markup language (XML) documents, which are indexed, e.g., annotated with tags, or other structured format in which the content is indexed. The illustrated knowledge base 12, which may be stored in memory 24 on the server, includes an annotated set of text strings which may be retrieved as responsive to a user's query. In particular, the text strings in the knowledge base 12 may take the form of defined cases, each of which describes a potential problem with the device 32. Each problem is associated, in the knowledge base, with a set of solutions that can potentially fix the problem. The problem descriptions describe problems known to be associated with the device 30 or with a family of devices to which the device 32 belongs, expressed in natural language. A defined problem description can be a short textual description of a problem that users may experience, e.g., a known problem with a device. For example, it could be the single sentence which describes a problem. In the case of a printer for example, an exemplary problem description may be "White lines when making copies from the document glass and document feeder." The set of defined solution sequences are also expressed in natural language. The solution sequences each comprise a sequence of one or more steps for a user to perform in attempting to solve the problem. A solution sequence may be composed of at least two parts: a title, which basically describes what needs to be done, and a description, which gives step by step instructions to the user to fix the problem. Since a problem identified by a user may have more than one possible root cause, cases in the knowledge base 12 may include more than one solution sequence. Additionally, two or more problem statements may be associated with the same solution. The knowledge base may be indexed according to the normalized forms of the words that occur in the problem descriptions, and optionally also the solutions, or parts thereof, and optionally their synonyms, as well as syntactic units that they contain. As will be appreciated, the exemplary embodiment is not limited to a knowledge base structured as described above but can include any circumscribed collection of searchable text.

As further described in application Ser. Nos. 11/544,200 and 11/354,688, each syntactic unit may be a linguistically coherent expression which is a sequence of words in the same sentence which are grammatically related, such as a noun phrase, a prepositional phrase, verbal syntactic unit, combination of these, or the like. For example, from the problem statement sentence above, the expressions "white lines", "from the document glass", and "from the document feeder" may be extracted for use as query suggestions.

The query suggestion collection and ranking module 18 collects linguistically coherent expressions from the knowledge base 12 and computes a ranking of the expressions, based at least in part on the logs 14 of previous troubleshooting sessions that also include user queries. These logs 14 may include logs 14 of troubleshooting sessions of multiple users for the same class of device. During a subsequent troubleshooting session, the typing module uses the collection of suggested queries to enhance the typing with a dynamic query suggestion mechanism.

In a typical troubleshooting session that is to be incorporated into the logs 14, a user may type a query concerning a device and submit it to the search engine 40 which then retrieves responsive instances, such as text strings, from the knowledge base 12. The user may check the responsive instances and, if none looks promising or there are none, may enter a new query or modify an existing one. If the user chooses to read a document returned as containing the responsive instance, a record of which document was retrieved may be stored in the log of the troubleshooting session. Several user queries may be submitted in a single session and may be identified as coming from the same session in the logs. The logs 14 may include sessions from multiple users regarding the same or a different device (generally one of the same general type or class).

Figure 3:
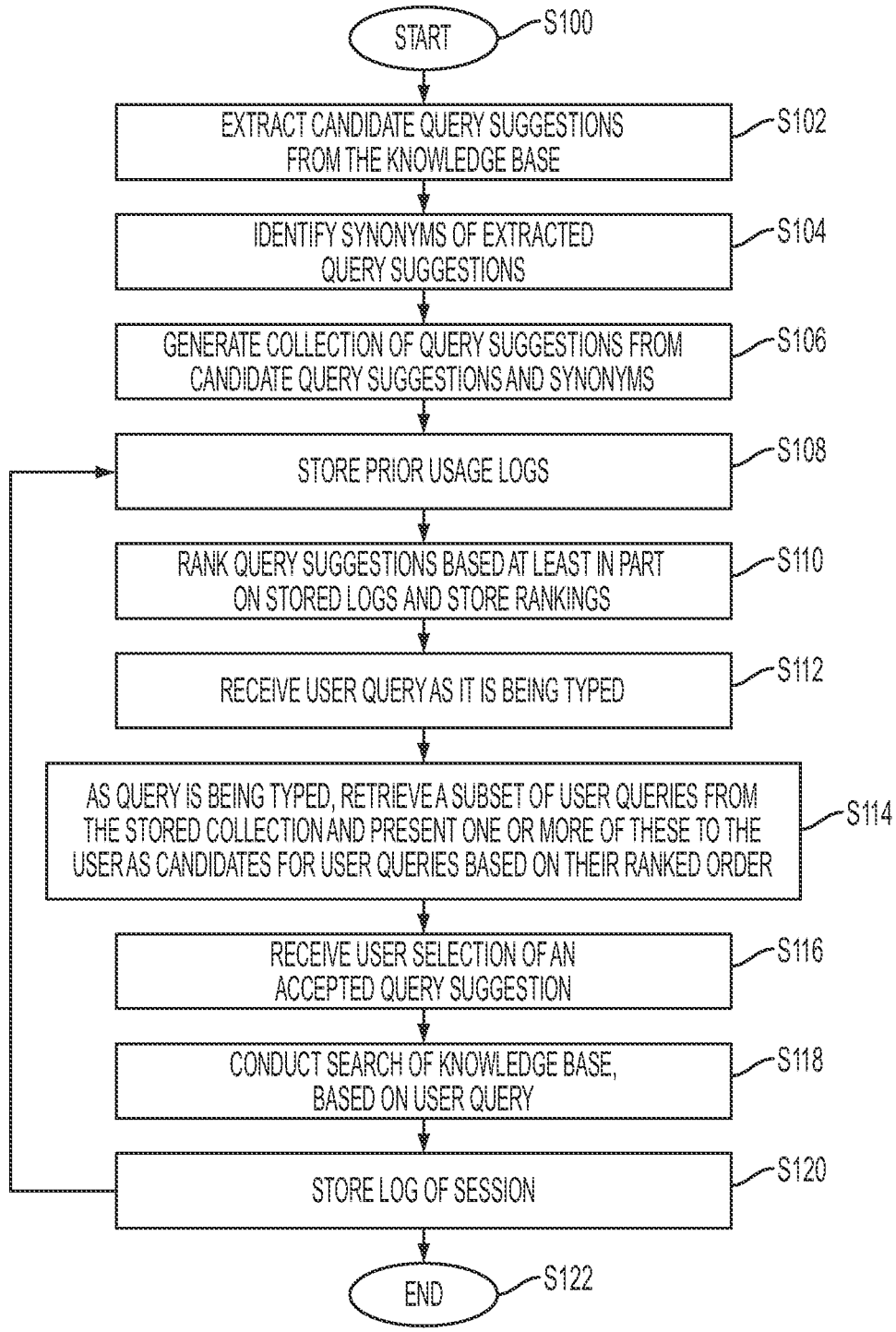
FIG. 3 is a flow diagram illustrating a method for development of query suggestions in accordance with a second aspect of the exemplary embodiment.

FIG. 3 illustrates an exemplary method for creation of the collection of dynamic query suggestions and ranking them to create a list of query suggestions for the user typing a query. FIG. 3 also illustrates how this list is dynamically updated during the typing. The method may include fewer, more, or different steps than those illustrated, and need not follow the precise order of the steps illustrated. The method begins at S100.

At S102, candidate query suggestions are collected from the knowledge base.

At S104, candidate query suggestions collected from the knowledge base and other candidate query suggestions that are synonyms of these are stored in the collection.

At S106, a collection of query suggestions is generated from the candidate query suggestions. Some of the query suggestions may group several candidate query suggestions having the same lemmatized (normalized) form and may be represented by the surface form of the query suggestion that occurs most frequently in the logs 14 (where two or more surface forms are found for the same lemmatized form of an expression). Each expression which is a synonym may be linked to the query suggestion for which it is determined to be a synonym.

At S108, logs of prior user interactions are stored as a collection of logs 14. For example, the suggestion collection and ranking component of the system 10 retrieves previously acquired logs which have been stored in an appropriate location in memory 24 during prior troubleshooting sessions and extracts relevant information from the prior logs for incorporation into the collection of logs 14. The collection of logs may include a listing of the typed user queries that were entered (and/or the lemmatized forms of the words in each query), and for each query, information indicating the context of the query, such as whether the user reformulated the query in the session, whether the user examined one of the search results after entering the query and prior to reformulating the query, or other information useful in performing a ranking, such as, where applicable, whether the diagnostic system 38 indicated that a fault was corrected thereafter or whether a user reported a problem was corrected. A simple scoring method may be automatically applied, based on a computed context of the query.

At S110 the query suggestions are ranked. The ranking of the collection of query suggestions may be performed by the suggestion collection and ranking component 18. In the exemplary embodiment, the ranking is based, at least in part, on information derived from the stored logs 14 of prior troubleshooting sessions. In one aspect, the ranking may take into consideration one or more criteria based on information related to the query suggestion that is derived from the logs 14 (such as its frequency in the logs and/or the contexts in which the query was placed), and one or more criteria based on information related to the query suggestion that is derived from the knowledge base 12.

At S112, a user begins to input a user query, e.g., by typing the query on the user interface. The system 10 is updated with the user's typed query during typing, e.g., as each new letter is typed it is received by the system. The system 10 therefore does not wait until the user submits an entire query to respond.

At S114, while the user types the query, one or more query suggestions from the collection 16 are presented to the user as candidates for user queries. The query suggestions presented are based on the content of the user query that has already been typed. This step involves filtering the collection of query suggestions according to a set of rules for identifying a subset of responsive query suggestions. The order in which the responsive query suggestions are presented is based on the ranking of the query suggestions in the collection 16.

At S116, the user may accept one of the presented query suggestions as the user's query.

At S118, the user's query may be input into the search engine 40. The search engine may retrieve one or more instances of the user query (adopted query suggestion) from the knowledge base and present these to the user for selection. Each of the instances may be in the form of a text string, such as a sentence or part thereof, such as a problem statement. Each retrieved instance includes a linguistically coherent expression which is one or more of a) an expression with the same surface form as the query suggestion, b) an expression with the same underlying (normalized) form as the query suggestion, and c) an expression which is a synonym of the query suggestion. When a user selects one of the instances, additional knowledge base content may be presented, such as the steps of at least one proposed solution stored in the knowledge base 12.

Prior to inputting the user's selected query into the search engine 40, the system may present options for refinement of the user's query, by presenting expansion terms. Each of the expansion terms may be the surface form of another linguistically coherent expression (which may also be a query suggestion) that is found in the same text string as the user's query in the knowledge base. For example, if the user query is "white lines", the system may present:

White lines when printing
White lines when printing and faxing
White lines when copying from the document glass
White lines when making copies from the document feeder
as refinement choices. Further details of such refinement methods are to be found in application Ser. No. 11/544,200, incorporated herein by reference.

In one embodiment, a user interface 30 such as that of Ser. Nos. 11/544,200 and 11/354,688, may be employed to develop a problem statement for retrieving one or more corresponding cases and their associated solutions from a knowledge base, although it is also contemplated that other techniques for generating a problem statement capable of being used by a search engine for retrieving solutions may be employed.

Steps S102-S110 generally all take place before a troubleshooting session, which makes use of the ranked query suggestions, begins. As will be appreciated, in such a troubleshooting session, i.e., beginning at S112 and ending at S118, the user may develop more than one user query prior to reviewing proposed solutions, depending on how relevant the solution statements appear to be to the user's perceived problem. The method may thus include one or more loops in which the method returns to S112. At S120, a log of the user's interactions with the system during such a troubleshooting session may be stored. Subsequently, the method may return to S108, where information from the troubleshooting session may be incorporated into the logs 14 and thereafter used to update the rankings of query suggestions in the collection 14. If the knowledge base 12 is subsequently updated, the collection of query suggestions may also be updated to reflect this.

The method ends at S122.

Figure 4:
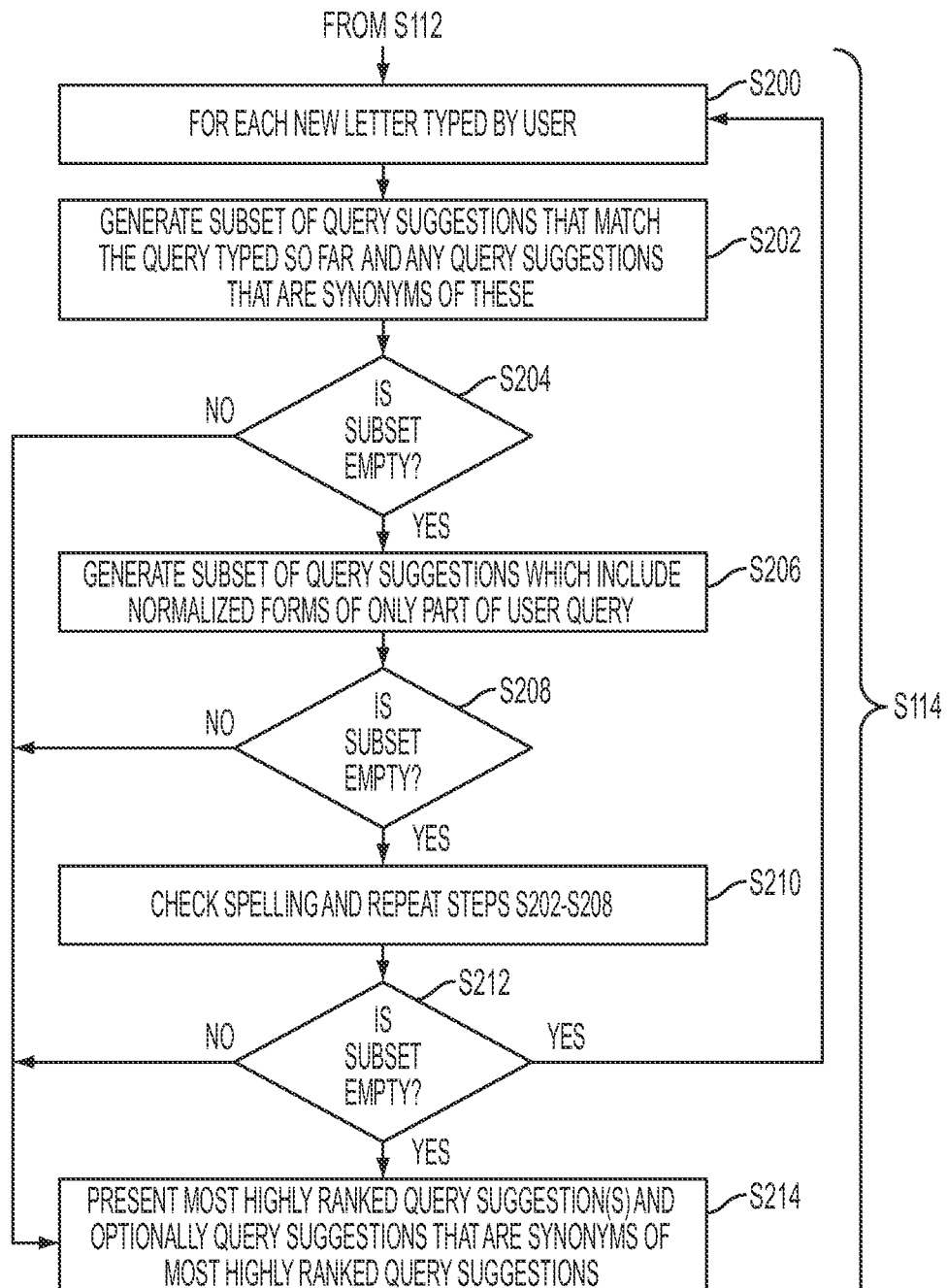
FIG. 4 illustrates substeps of the exemplary method of FIG. 3.

FIG. 4 illustrates exemplary substeps which may take place in the presentation of query suggestions (S114). In particular, at S200, for each new letter typed by the user, at S202, a subset of query suggestions is generated, based on the user's query typed thus far. In the initial stage, the entire user query typed thus far is considered and only those query suggestions matching the entire query are returned. Query suggestions that are synonyms may also be returned at this stage. At S204, if the subset is empty, the method proceeds, to step S206 where query suggestions matching only a part of the query are returned. If at S208, the subset is empty, the spelling of the query may be checked at S210 and the previous steps S202, S204 and optionally S206 repeated as necessary. If at S212, the subset is still empty, no query suggestions are returned and the method returns to S200 and waits for the user to revise the query. Otherwise, at S214, one or more of the most highly ranked query suggestions may be presented to the user as candidates for autocompletion of the user's query, with synonyms positioned close to the query suggestions of which they are synonyms. In the exemplary embodiment, the substeps of S114 may be interrupted at any time by the user's addition of another letter or letters or other modification to the user query, in which case, the method returns directly to S200.

Further details of the exemplary method will now be provided.

Collection of Candidate Suggestions (S102)

The collection of candidates for query suggestion may be constructed from the index of the knowledge base. In particular, the following elements of the index are relevant as query suggestions:

1. Syntactic units: In the exemplary embodiment, the indexing mechanism used to index the knowledge base 12 is one which can extract, from a parsing of the knowledge base content, a list of syntactic units (e.g., self contained expressions such as 'white lines', 'on edge of copy', or 'when printing'). Such an indexing mechanism is described in U.S. Pub. No. 20070192085, incorporated by reference. In the system disclosed in that publication, the syntactic units are the expressions which are used by a disambiguation mechanism once the query has been typed. In the present method, they are used as a primary source for query suggestions since they guarantee that a query built from them will have perfect matches in the content and will provide high quality search results. If the knowledge base 12 is not already indexed according to syntactic units, a parser, such as described in U.S. Pat. No. 7,058,567, may be employed to parse text in the knowledge base, identify words of each text string (e.g., sentence) as a series of tokens, and group one or more of the words of a text string as a syntactic unit according to one or more syntactic relationships identified between the words in the group.

2. Synonyms: In addition, thesaurus 42 can be used during the indexing, to provide a list of synonym expressions which are not part of the knowledge base terminology but which enrich it. Each of these expressions is linked to a corresponding knowledge base original expression. For example, the expression "paper jam" may be an original expression in the knowledge base and may have linked to it the synonym "paper misfeed", which is not present. The synonyms will therefore also guarantee to provide one or more search results when used as a query. The synonyms are generally domain specific in that they are expressions which a user may be expected to use in a search in the particular domain of the knowledge base. If the knowledge base 12 is already indexed according to synonyms, a separate thesaurus need not be used.

Ranking of Query Suggestions (S106)

Selecting the candidate query suggestions from the knowledge base index ensures that the query suggestions proposed to the user will generate some meaningful results. The purpose of the ranking is to help make the query suggestions which are most likely to be successful to be more visible (e.g., at the top of the list of query suggestions offered to the user) in the typing process.

A number of criteria may be employed for ranking the query suggestions, which may be employed singly or in combination. The criteria generally follow two separate rationales. The first rationale is to favor query suggestions that would lead to queries with high quality results. This may be achieved by scoring a query suggestion based on content of the knowledge base. This may be expressed in terms of an overall knowledge base score $S_c$. The second rationale is to favor suggestions that will be more likely to express what the user was trying to type. This may be achieved by scoring a query suggestion based on the logs. This can be expressed in terms of an overall log-based score $S_l$. These criteria can be combined together with an appropriate weighting to generate an overall score $S_{total}$, for the query suggestion, as follows:

$$S_{total} = \frac{k_1}{N} S_l + k_2 S_c \qquad \text{Eqn. (1)}$$

where N is the total number of query suggestion instances stored in the logs and $k_1$ and $k_2$ are two weights that can be defined to favor one criteria or the other depending on the type of application. In one embodiment, appropriate values for $k_1$ and $k_2$ may be learned during a training phase of the system, through the analysis of user preferences, so as to provide the best combination of the criteria. The query suggestion with the highest ranking is placed at the top of the list, and so forth.

In the exemplary embodiment, $k_1$ and $k_2$ are both non-zero, thus both content score $S_c$ and log score $S_l$ are computed and used to determine an overall score. Where a query suggestion is not found in the logs 14, the contribution of the first term in the above formula will be 0 and its ranking may be based solely on the knowledge base component (second term). As will be appreciated each of the scores $S_c$ and $S_l$ can in turn be a function of one or more criteria. Query suggestions that are synonyms may be accorded the same ranking as the corresponding query suggestions of which they are synonyms.

Score Based on the Logs $S_l$

In the case of the log-based score $S_l$, (scoring a query suggestion based on the stored logs of prior user troubleshooting interactions with the system), this may be a function of one or more log-based criteria, such as a score $S_l f$, which is based on a frequency $f_l$ of occurrence of a query suggestion in the logs (as represented, for example, by the frequency of its lemmatized form) and/or a score $S_l p$, based on a measure of the performance p of the query, based on the logs 14 (an estimate of the probability of success of the query suggestion). In one embodiment, a combined score $S_l s$ is computed which is a function of both frequency and performance. The combined score $S_l s$ or an appropriately sum of weighted values of $S_l f$ and $S_l p$ may be employed as the overall log-based score $S_l$.

In one embodiment, the query suggestions are ranked as a function of their frequency $f_l$ in the logs. Thus, query suggestions which occur more frequently in the logs tend to have higher rankings. To compute the frequency $f_l$ of a query suggestion, meaningful words are first identified in the expression. These are words capable of generating a limited set of search results. The ones that will be considered as stop-words by the search engine (i.e., generate more than an acceptable number of results) are not considered. Thus, words such as "on" and "the" are typically not considered among the meaningful words. The set of meaningful words of the expression is then lemmatized. Lemmatization involves identifying the normalized form of a word or associated group of words. Thus the normalized form of "printing" is "print" (its infinitive form) and for "lines" is "line" (its singular form). This set of lemmatized words is compared with the set of lemmatized words computed for each old user query stored in the logs 14. When the set of meaningful lemmatized words of the query suggestion expression is a subset of the set of lemmatized words of the old user query, the query suggestion expression is considered to be found in the logs and the frequency of the query suggestion is incremented. Typically, all of the queries in the log are normalized and the frequencies of these normalized forms are calculated and stored, prior to performing the comparison. This collection of stored normalized queries is then accessed with the set of lemmatized words to retrieve the associated frequency.

As noted above, query suggestions can be uniquely identified by a set of lemmatized words. As a consequence, potentially several expressions with different surface forms will represent the same (lemmatized) query suggestion. For example, the set of words {white, line} could exist in the surface forms of "a white line", "the white line", or "white lines". In one embodiment, the surface form of the query suggestion that is the most frequently occurring in the logs is identified and is stored to be used as the representation of the query suggestion when displaying it to the user (S114).

In another embodiment, the query suggestions are ranked as a function of their context in a search session. Query suggestions can be classified according to the context of their instances in the search session. The context may be assigned from a predetermined set of contexts, with each context having an associated score value. In this regard, the logs may store query instances as a sequence of events in time. Moreover, these events may be grouped into sessions where one session corresponds to consecutive events initiated by the same user. (The user may be identified, for example, using session IDs embedded in URLs, cookies, or from the IP address of the computing device hosting the user interface).

The location of a query instance in a session (its context) can give an idea of how successful the query was. For example, if a query instance has not been reformulated (i.e., it is the last one of its session) it can be considered as more likely to be successful than a query instance that has been reformulated. When other user interactions are stored together with query instances in the logs, they can also be used to estimate the probability of success of a query instance. For example, if the query instance is followed (or not followed) by a user's selection of a solution page, this may be an indication that the query has a higher (or lower) probability of success. In one embodiment, the probability of success of a query instance in the logs can be used to weight the increment that will be given to the frequency of a suggestion matching this query instance.

The following example illustrates an exemplary session which may be found within the stored logs:

```
BEGIN Session: ABC123
Date: 2007-11-09_05:41:05.047
Country: GBR
Printer: DEFG21XY
Interactions ====>
Request -> Time: 12771208 User query: slow
Request -> Time: 12771854 User query: driver settings
Request -> Time: 12774149 Parameter: PAGE=How to Re-install the
Print Driver on a Server with Microsoft Windows 2000 Operating
System (OS)
Request -> Time: 12774154 Parameter: PAGE=Re-install the Print
Driver on a Server with Microsoft Windows 2000 Operating System
(OS)
Request -> Time: 12774494 User query: port settings
Request -> Time: 12775138 User query: raw port settings
Request -> Time: 12776270 Parameter: PAGE=How To Modify the
Protocol Setting From RAW to LPR on a Standard TCP/IP Port on a
Workstation or Server With Microsoft Windows 2000 / XP Operating
System (OS)
Request -> Time: 12776275 Parameter: PAGE=Modify the Protocol
Setting From RAW to LPR on a Standard TCP/IP Port on a
Workstation or Server With Microsoft Windows 2000 / XP Operating
System (OS)
Request -> Time: 12777532 User query: ps memory settings
Request -> Time: 12778110 User query: print processor
Request -> Time: 12778243 User query: slow print jobs
Request -> Time: 12778810 Parameter: PAGE=Jobs are Not Printing
from the Print Queue at the Machine and the Job Status Displays
Processing
END session on: Case
```

In this particular session, the user's first user query was the word "slow". The user did not select to review any of the search results generated by this query and instead input the query "driver settings". The user chose to look at one of the results generated (How To Re-install the Print Driver on a Server With Microsoft Windows 2000 Operating System (OS)) and then looked at a second of the results. Thereafter, the user input another user query, "port settings", which was subsequently modified.

In this case, the ranking mechanism may favor the query instance "slow print jobs" because it was not reformulated. Additionally or alternatively, the ranking may favor the query instances "driver settings", "raw port settings", and "slow print jobs" because they were followed by the selection of one or more results of the search.

Additionally, if information on the failure and success of past troubleshooting sessions is available, this information may be used to select only the latest queries from the successful sessions or at least to favor them when computing the frequency of the suggestions. In the context of a troubleshooting diagnostic system embedded in the device, the diagnostic system 38 has access to the state of the device and can in some cases, for example in the case of a paper jam clearing, detect automatically if the paper jam has been cleared during the troubleshooting session and infer that the latest query instance was effective in providing a solution corresponding to the problem experienced by the user.

Other successful troubleshooting outcomes, where the system cannot detect automatically that the problem has been solved, for example in the case of fixing an image quality problem, can be recorded by prompting the user for feedback on his/her success at the end of the session.

As noted above, different pieces of information in the logs can be used for the ranking of the query suggestions and each may be relevant for the ranking for different reasons. In one embodiment, a plurality of criteria are integrated in the computation of a score $S_l s$ for a query suggestion by summing, over all instances of a query suggestion in the logs 14, a weighting that is based on a probability that a particular instance yielded successful results. Such a computation may be given by the formula:

$$S_l s = \sum_{\substack{Q_i \supseteq S \\ Q_i \in Q}} W(Q_i) \quad (1)$$

where a query suggestion S is modeled as a set of words, Q is the set of query instances in the logs and each query instance Qi is modeled as a set of words. The score $S_l s$ of a query suggestion is computed as a sum where the terms are defined as a function W applied for each query instance in the logs containing all the words of the query suggestion. $S_l s$ can be used as $S_l$ in Eqn. (1) above, or combined with other scores for other log-based criteria.

The function W models the probability of success of a query instance given its context in the logs. One way to define this function is:

$$W(Q_i) = \begin{cases} a & \text{if } Q_i \text{ reformulated} \\ b & \text{if } Q_i \text{ followed by a selection} \\ c & \text{if } Q_i \text{ ends a session known to have been successful} \\ d & \text{otherwise} \end{cases}$$

where $a \leq d \leq b \leq c$

Score Based on the Knowledge Base $S_l$

The score $S_c$, which is based on the content of the knowledge base, may similarly be a function of one or more criteria, such as a measure of the relative importance $r_c$ of a query suggestion in the knowledge base content. Thus, in addition to the possible uses of the logs for ranking the query suggestions that are described above, the content and structure of the knowledge base may also be used for ranking the query suggestions. The underlying rationale for this is to favor expressions that, if used as a user query, would generate results scored highly by the search engine.

In one embodiment, query suggestions are scored higher if they have a higher $r_c$, e.g., if they occur in a document title (assuming that titles are given more weight by the search engine ranking system) or in another context in the knowledge base which is considered to connote importance. In one embodiment, the $S_c$ score component for a query suggestion is computed by performing a search of the knowledge base using the query suggestion and retrieving the list of results for this search. One option is to assign to $S_c$ the highest score $r_c$ of the results returned by the search. For example if a query is input to the search engine based on the query suggestion "paper jam", $S_c$ may take the value of the highest scored result returned.

While the score $S_c$ may additionally or alternatively be a function of the frequency $f_c$ of occurrence of a query suggestion in the knowledge base, frequency of occurrence is not always a good indicator of its usefulness. Where used, $f_c$ may be computed from the number of instances of the query in the knowledge base, e.g., the number of problem statements which are retrieved by querying the knowledge base with the query suggestion.

Dynamic Update of the List of Query Suggestions (S114)

The substeps outlined in FIG. 4 represent one method of dynamic update of the list of query suggestions in the subset, although modifications or variations in these substeps are readily contemplated.

Providing query suggestions while a user is typing queries in this way can reduce the amount of typing a user needs to do. In the exemplary embodiment, the sequence of characters already typed in by the user is used to filter the ranked collection of query suggestions. The best ranked suggestions in the subset of query suggestions resulting from the filtering are displayed in region 58, e.g., below the typing area 54, so that at any time, the user can pick one of the query suggestions to shorten the typing. For example, the user may click on the query suggestion and the system then updates the user query to reflect that the user has adopted the query suggestion.

The filtering that is performed on the collection of query suggestions is different from that of conventional systems for query expansion. In the exemplary embodiment, query suggestions to be included in the subset include query suggestions that contain the words already typed by the user and/or that contain words starting with what is being typed. More broadly, a responsive query suggestion may be one which meets at least one of the following criteria:

a) it includes all of the typed words and any partial words, b) its normalized form includes all of the normalized forms of the typed words and any partial words, c) it is designated as synonym of another query suggestion that is determined to be responsive, d) its normalized form includes at least one and fewer than all the normalized forms of the typed words and any partial words e) in a corrected form (e.g., by use of the domain-specific spellchecker), it meets one of the above criteria a), b), c), d).

In one embodiment, one or both of criteria d) and criteria e) may be invoked (S206 and S210) only when the prior criteria return no query suggestions or only a limited number of query suggestions, such as zero or only one or only two query suggestions).

To implement the filtering, the user query is first tokenized into words, or the prefix of a word for the rightmost part. These words (if entire words) are then lemmatized. Finally, a search is performed over the collection of query suggestions. Every query suggestion that contains the set of words (or word prefix) of the query (e.g., satisfies one or more of criteria a), b) c), and optionally criteria d) or e) in the event that the other criteria are not successful, is returned as the results of the search.

For example, in the context of a MFD troubleshooting scenario, if the user is typing "li", the most highly ranked filtered query suggestions may include single-word expressions starting with "li" as in "line," "light," "list" but may also include multiple word expressions where one word (not necessarily the first one) starts with "li" as in "lighter copies," "black lines". In another example, once the user has already typed an entire word and is typing a second one, as in the query "feeder t", responsive query suggestions may include expressions such as "document feeder tray," "high capacity feeder tray," "document feeder top cover", and the like.

When the user entry contains several words and no suggestion is available for the whole expression, an option is to propose suggestions for the longest latest part of the entry (S206). For example, in the MFD context, if the user has entered "noise" the query suggestions available may be:

noise
grinding noise
a clicking noise
loud noises
any unexpected noise

If the user types an additional word starting with "c" the query is now "noise c" and only the three following query suggestions are available:

a clicking noise
causing an intermittent grinding noise
a high pitched noise can be caused If the user adds an "a" and "r" because what he/she meant is "cartridge", the system does not find any suggestions for "noise car" and, in the exemplary embodiment, looks for suggestions for "car" and returns:

cartridge
toner cartridge
install the cartridge
staple cartridges
when the cartridge has been replaced In this case, if the user selects the query suggestion only the corresponding part of the query will be replaced by the suggestion, i.e., in the above example the query will become "noise cartridge" if the user takes the first query suggestion. This will return no responsive instances until the user makes further modifications to the user query or if the search engine is capable of returning responsive instances to a partial query.

In the exemplary embodiment, the synonym suggestions are treated somewhat differently from other query suggestions. These query suggestions are displayed both when they match the set of characters already typed by the user and also when they are synonyms of one of the matching expressions. For example when the user is typing "j" query suggestions in the MFD context may be:

jam
multifeed
misfeed
job

The query suggestions "misfeed" and "multifeed" are particular cases of jams and have been indicated as potential synonyms for "jam" in the thesaurus. In order to avoid creating confusion, these suggestions are listed just below the actually matched expression "jam", i.e., their score is equal to the one of jam. In one embodiment, the thesaurus is relatively small and there are not too many synonyms competing with other matching expressions, like "job." Thus, it is reasonable for the synonym expressions to be suggested in each case where there are found. In other embodiments, these suggestions may be shown only once the user has typed in enough content and/or the number of non-synonym available suggestions is below a threshold.

If there is no query suggestion for a user entry, a spell checker can be used to verify if there were no typing mistakes and to use the query suggestions as a way to correct them (S210). Unlike usual spell-checkers, the domain-specific spelling corrections may be made using different dictionaries for validation and suggestion steps. For the validation step, the spell checker uses a general dictionary as usual. However for the suggestion step, proposed corrections are taken from the limited list of words that are part of the corpus of the knowledge base. A new filtering can be then applied with the proposed corrections and may lead to the retrieval of query suggestions from which the user may select one of the suggestions.

The method illustrated in FIGS. 3 and 4 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIGS. 3 and 4, can be used to implement the method assisting a user to formulate a query to be input to a search engine.

One specific embodiment of the system and method is for troubleshooting problems with an MFD. In this embodiment, the system provides a user who is troubleshooting a machine the ability to search among the set of possible solutions to the problem he is experiencing. In this system, the knowledge base contains a list of potential problems, and each problem is associated with an ordered list of solutions that can potentially fix the problem. The knowledge base is accessible from a web server that supports navigation of the knowledge base and natural language query searches performed during a troubleshooting session. The server also logs all the interactions and queries performed by the users. A web browser runs on all the MFDs which are able to access the server and enables users to query the web server directly from the embedded touch-sensitive screen.

Figure 6:
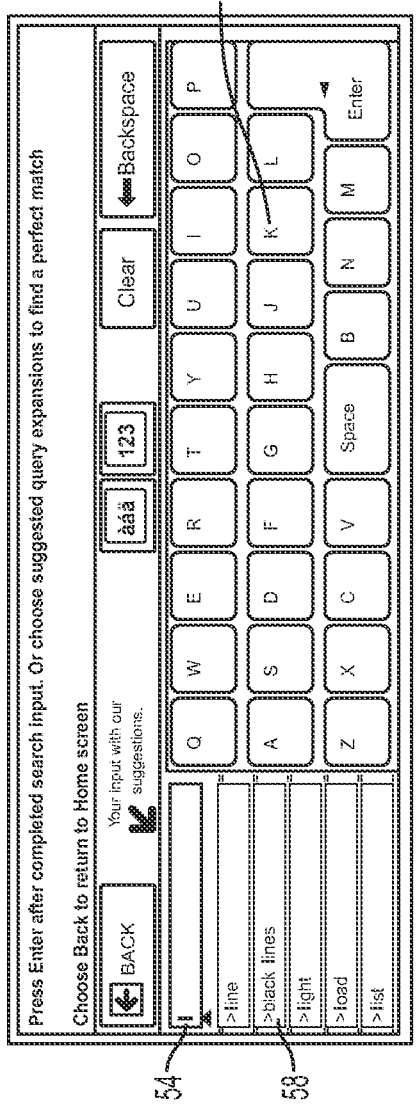
FIG. 6 illustrates initiation of a user query on the query typing interface of FIG. 3.
Figure 7:
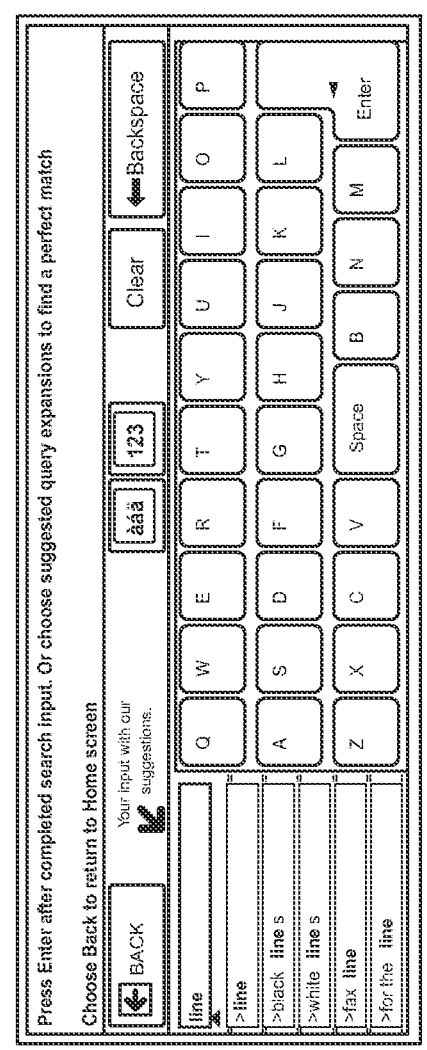
FIG. 7 illustrates query suggestions after further typing has taken place.

FIGS. 5, 6, and 7 show the GUI 30 displayed to the user for entering a search query. In the exemplary embodiment, the MFD device hosting the GUI does not have a full alphanumerical keyboard and therefore a soft-keyboard is available to the user for typing the query. The left side of the screen is used to display the query typed by the user, and below it the suggestions for completion provided the system are displayed.

FIG. 6 illustrates the effect of "pressing" the letter l on the soft keyboard. The letter l is added to the query box and query suggestions of expressions containing one or more words starting with "l" are displayed below. At any moment, the user can select one of the query suggestions in the list and the query box content will be updated with the selected query suggestion. If the user continues typing, the query suggestions are adapted to the query as illustrated in FIG. 7, which shows the most highly ranked query suggestions for the user input "line".

The exemplary embodiment addresses, via a single interface feature, several distinct problems: the difficulty of entering text via a limited interface device, and the user's lack of knowledge of proper spelling and of the vocabulary used in the documents being searched. In various aspects, the system combines word completion, spelling correction, and synonym replacement via a single mechanism.

As noted above, the exemplary system and method assist a user in developing a query by suggesting alternative queries for performing a natural language query search in a closed corpus such as a troubleshooting knowledge base. The exemplary system may combine the following features:

Query suggestions are expressions constructed from the linguistic analysis of the corpus.

Query suggestions are proposed to the user while typing each character of the query.

Query Suggestions are ranked, taking into account their usage in previous sessions and optionally the context of their occurrence in the knowledge base.

The cost of servicing devices, such as MFDs, can be reduced substantially when people are able to self-troubleshoot using the troubleshooting knowledge base 12. It has been shown in repeated tests that a large problem customers have using the troubleshooting knowledge base is formulating their query. For a query to be successful, its terminology must match that of the knowledge base and this is non-obvious to many customers who are not knowledge base or device experts. Problems in formulating the query are compounded by the query-entry mechanism. For example, a touch screen keyboard is more cumbersome to use than a physical keyboard. The exemplary system and method help users to formulate their query better by offering query suggestions which are guaranteed to produce results. These suggestions help the user to understand the contents of the knowledge base and reduce the burden of typing on a touch screen keyboard.

The exemplary embodiment provides a system and a method for query suggestion, which contrasts with query expansion in that the system proposes alternative queries, which are not necessarily extensions of the original, rather than always proposing additional words to be added to the query. It is generally used in search engines with AND semantics, i.e., where a document (or instance) must contain all of the words of the query in order to be considered a match, and thus adding words to the query generally reduces the number of results.

Both query expansion and query suggestion can be used to address the problem of vocabulary mismatch between queries and documents. The query expansion approach is most appropriate when the same concept may be expressed in many different ways in different documents, because it allows a single query to retrieve documents containing a variety of different expressions. Query suggestion, since it asks the user to pick just one of the suggested terms, is more appropriate when inter-document variation is small but the user has no prior knowledge of the terms used in the documents. This is the situation, for example, in some troubleshooting knowledge bases, in which editors enforce a controlled vocabulary for technical terms. In addition, while query suggestions can be provided while typing, query expansions can be proposed only once the user has already typed a valid query.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for assisting a user to develop a query in a natural language, comprising:
   storing logs comprising information derived from prior user search sessions in which user queries were input to a search engine for retrieving responsive instances from a knowledge base;
   storing a collection of query suggestions, each of the query suggestions formulated to retrieve at least one responsive instance in the knowledge base, each query suggestion being constructed from an index of the knowledge base and comprising a linguistically coherent expression which includes one or a group of syntactically related words, the query suggestion having a surface form which is presented to a user and an underlying form, and wherein at least one instance of each query suggestion is present in the knowledge base;

ranking the query suggestions in the collection, based at least in part on the stored logs and the frequency of instances of the query suggestion in the knowledge base;

receiving a user's query in a natural language; and while the user's query is being entered, with a computer processor, generating a subset of the ranked collection of query suggestions and presenting at least one of the subset to the user as a candidate for a user query, the subset being based on that portion of the user's query already entered, the presentation of query suggestions in the subset of query suggestions being based on their respective rankings in the collection, whereby at least some of the presented query suggestions are alternate queries rather than extensions of the user's query.

2. The method of claim 1, wherein each of the responsive instances comprises a text string.

3. The method of claim 1, wherein the presenting of the query suggestions comprises, for at least one of the query suggestions, presenting a linguistically coherent expression.

4. The method of claim 3, wherein the linguistically coherent expression is at least one of: the same as, is a synonym of, or has a normalized form which is the same as that of, an expression in at least one responsive instance in the knowledge base.

5. The method of claim 1, wherein the user queries relate to troubleshooting a problem with a device and each of the knowledge base instances comprises a text string expressing at least one of a known problem with devices and a known solution to a known problem.

6. The method of claim 1, wherein the ranking is based at least in part on a frequency that a query suggestion is found in the stored logs.

7. The method of claim 6, wherein the ranking comprises, for each of the query suggestions, determining a frequency with which a normalized form of meaningful words in the query suggestion appears in the logs, the ranking being based on the determined frequency.

8. The method of claim 1, wherein the storing of the logs includes, for each of a plurality of user queries, storing a context in which the user query occurred in the respective session, the context being selected from a plurality of predefined contexts.

9. The method of claim 8, wherein the ranking of the collection of query suggestions is based at least in part, on the stored contexts.

10. The method of claim 1, wherein the presentation of the query suggestions includes presenting the surface form of at least one of the query suggestions in the subset.

11. The method of claim 1, wherein the surface forms of at least some of the query suggestions are derived from prior user queries stored in the logs.

12. The method of claim 1, wherein the ranking of query suggestions is based at least in part on a relationship between one of the query suggestions and the knowledge base, the ranking of each query suggestion optionally being based at least in part on scores of responsive instances in the knowledge base.

13. The method of claim 1, wherein the presenting of the subset of the ranked collection of query suggestions to the user as candidates for user queries includes updating the subset as more of the user query is entered.

14. The method of claim 1, wherein the method further includes, providing for the user to accept the query suggestion as the user query and querying the knowledge base based on the user query.

15. The method of claim 1, further comprising:
extracting candidate query suggestions from the knowledge base; and
grouping candidate query suggestions that have an equivalent normalized form into a single query suggestion with a surface form which is suitable for presentation to the user.

16. The method of claim 1, wherein where one of the query suggestions in the collection is a synonym of another query suggestion in the subset, presenting the query suggestion that is a synonym together with the query suggestion of which it is a synonym.

17. The method of claim 1, wherein the presenting includes displaying a surface form of at least a most highly ranked of the subset of query suggestions on a graphical user interface.

18. A computer program product comprising a tangible computer-readable recording medium encoding instructions, which when executed on a computer causes the computer to perform the method of claim 1.

19. A system for assisting a user to develop a query in a natural language, comprising:
memory which stores a ranked collection of query suggestions, each of the query suggestions formulated to retrieve at least one responsive instance in the knowledge base, each query suggestion being constructed from the knowledge base and comprising a linguistically coherent expression, at least some of the linguistically coherent expressions including a group of syntactically related words, the query suggestion having a surface form which is presented to a user and an underlying form, at least one instance of each query suggestion being present in the knowledge base, a ranking of the query suggestions in the collection being based at least in part on stored logs of prior user interactions;
a troubleshooting session support module in communication with the memory which receives a user's query in a natural language and, while the user's query is being entered, presents at least one of a subset of the ranked collection of query suggestions to the user as candidates for user queries, the subset being based on that portion of the user's query already entered, the query suggestions in the subset of query suggestions being presented according to their respective rankings in the collection.

20. The method of claim 1, wherein at least some of the stored query suggestions each comprise a group of syntactically related words.

21. The method of claim 12, wherein the ranking of each query suggestion is based at least in part on scores of responsive instances in the knowledge base.

22. The system of claim 19, further comprising a query suggestion collection and ranking module which ranks the collection of query suggestions based at least in part on the stored logs.

23. The system of claim 22, wherein the query suggestion collection and ranking module extracts candidate query suggestions from the knowledge base.

24. The system of claim 19, wherein at least some of the query suggestions in the collection are each only a synonym of an expression in one of the responsive instances in the knowledge base and wherein the synonym is accorded a ranking which is the same as another query suggestion which has a normalized form which is the same as that of the expression.

* * * * *